Nov. 2, 1948.  S. NOODLEMAN  2,452,784
ELECTRICAL MOTOR CONTROL SYSTEM
Filed Jan. 24, 1945  2 Sheets-Sheet 1

INVENTOR.
SAMUEL NOODLEMAN
BY William D. Hall.
ATTORNEY

Patented Nov. 2, 1948

2,452,784

UNITED STATES PATENT OFFICE 2,452,784

ELECTRICAL MOTOR CONTROL SYSTEM

Samuel Noodleman, Dayton, Ohio, assignor, by mesne assignments, to the United States of America as represented by the Secretary of War Application January 24, 1945, Serial No. 574,369

1 Claim. (Cl. 318—29)

The present invention relates to electromechanical systems such as servo or remote indicator systems for transmitting mechanical position from one point to another by electrical means.

In the electrical transmission of angular position, one means conventionally employed for this purpose comprises a pair of "Selsyns" (trade name denoting a type of small, self-synchronous, alternating-current machines) so arranged that an angular movement imparted to the rotor of the transmitting "Selsyn" effects a corresponding movement in the rotor of the receiving "Selsyn." Inasmuch as "Selsyns" are capable of transferring relatively little torque, it is the principal purpose of this invention to provide a simple, accurate, servo system developing greater power, which either partially or wholly eliminates "Selsyns" and instead makes use of one or more continuously variable auto-transformers for controlling the movement of a motor or the like from a remote point in accordance with the movement of another member of the system.

For an understanding of this invention, as well as other features thereof, reference is had to the following detailed description and the accompanying drawings in which.

Figure 1:
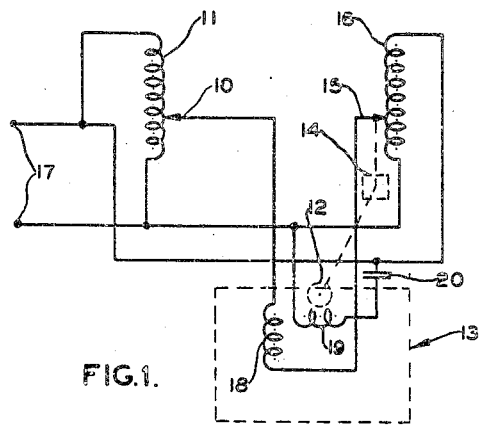
Fig. 1 is a schematic view showing one preferred embodiment of a servo system in accordance with the invention.

Referring now to Fig. 1 there is shown the schematic circuit diagram of a complete servo system for transmitting angular movement imparted to the adjustable contact 10 of a continuously variable auto-transformer 11 (the travel of the contact 10 actually being arcuate, although represented in Fig. 1 as straight for simplicity of illustration) to the armature 12 of a split-phase induction motor 13. Since one type of continuously variable auto-transformer is commonly known by the trade name "Variac," such transformers, in a general sense, will hereinafter be designated as "Variacs."

The armature 12 is mechanically coupled by means of a gear arrangement 14 or equivalent mechanism to the adjustable contact 15 of a second "Variac" 16. The windings of "Variacs" 11 and 16 are connected in parallel to a source of alternating current applied at terminals 17. The field winding 18 of motor 13 is connected between the adjustable contacts 10 and 15 while the field winding 19 is shunted across the alternating current source 17 through a coupling condenser 20. The "Variac" 11 is installed at the transmitting station and is associated by extended lines with "Variac" 16 and motor 13 at a receiving station.

It will be evident that when the adjustable contacts 10 and 15 are set in corresponding positions, no voltage difference will exist therebetween; consequently, the armature 12 of motor 13 will not rotate since the field winding 18 is not energized. However, as the contact 10 is displaced, thereby establishing a voltage difference between contacts 10 and 15 whose magnitude and phase is a function of the extent and direction of said displacement, the armature 12 rotates in a direction causing the contact 15, to which it is coupled, to be displaced in a direction and to an extent reducing this voltage difference to substantially zero level, whereupon motor 16 again stops. In this manner, the armature 12 is caused to accurately follow the angular movement imparted to the adjustable contact 10.

Figure 2:
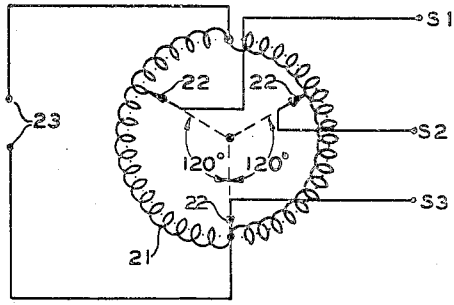
Fig. 2 is a diagrammatic representation of a variable auto-transformer such as is referred to hereinabove.
Figure 3:
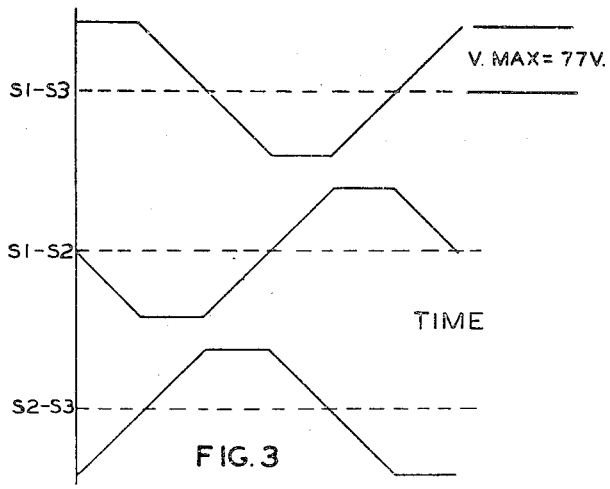
Fig. 3 is a diagram of the voltage relations at the output terminals of the transformer disclosed in Fig. 2.

Fig. 2 shows the desired construction of a "Variac" adapted for the operation of servo systems such as which will be discussed in connection with Figs. 4 and 5. The "Variac" winding 21 is arranged in the form of a ring coil. Three movable contacts 22 are provided mounted on a tripod support whose members are equally spaced and rotated by a central shaft. A source of alternating current applied at terminals 23 is connected to the winding 21 at opposing points thereof. The two halves of the winding 21 intermediate these points are preferably so arranged that their magnetic fields aid each other. Assuming, by way of example, that the voltage applied to terminals 23 is 115 volts it will be apparent that between any two contacts 22 the voltage cannot exceed 77 volts, or two-thirds of the total applied voltage. Contacts 22 are connected to output terminals S1, S2 and S3 respectively. The voltage distribution between the terminal pairs S1—S2, S1—S3 and S2—S3 and the variation thereof with respect to time in the course of a complete revolution of the contacts 22 is illustrated in Fig. 3, where it will be observed that the magnitudes of the various voltages available at these terminal pairs depend upon the angular position of contacts 22.

Figure 4:
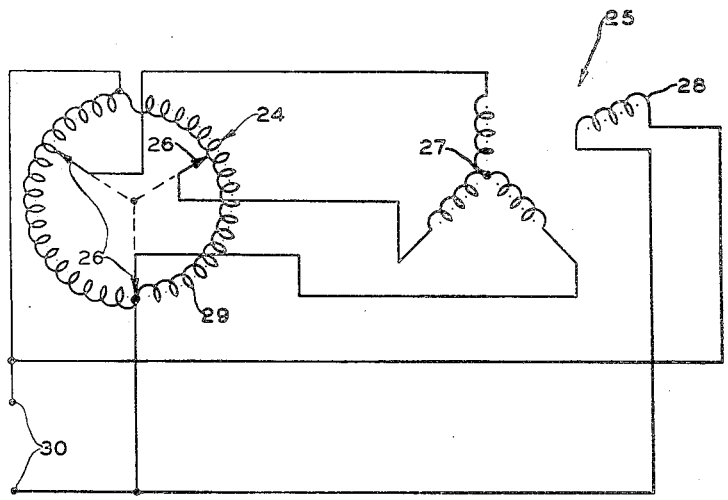
Figs. 4 and 5 are wiring diagrams of other preferred embodiments of a servo system in accordance with the invention.

Referring now to Fig. 4, a "Variac" 24 of the type described in connection with Fig. 2 is shown arranged to control a three-phase synchronous motor 25. The movable contacts 26 are each connected to respective terminals of the field windings 27 of motor 25, and the armature winding 28 thereof as well as the ring coil 29 of "Variac" 24 are connected across the alternating current line applied at terminals 30. As the shaft bearing the contacts 26 of "Variac" 24 is displaced in angular position, the voltage distribution in the field winding 27 is so affected as to cause the rotor 28 of motor 25 to assume an angular position in accordance with the adjustment of said shaft. The "Variac" 24, in an arrangement such as shown in Fig. 4, may also be used to drive a "Selsyn" motor which is similar to a synchronous machine.

Figure 5:
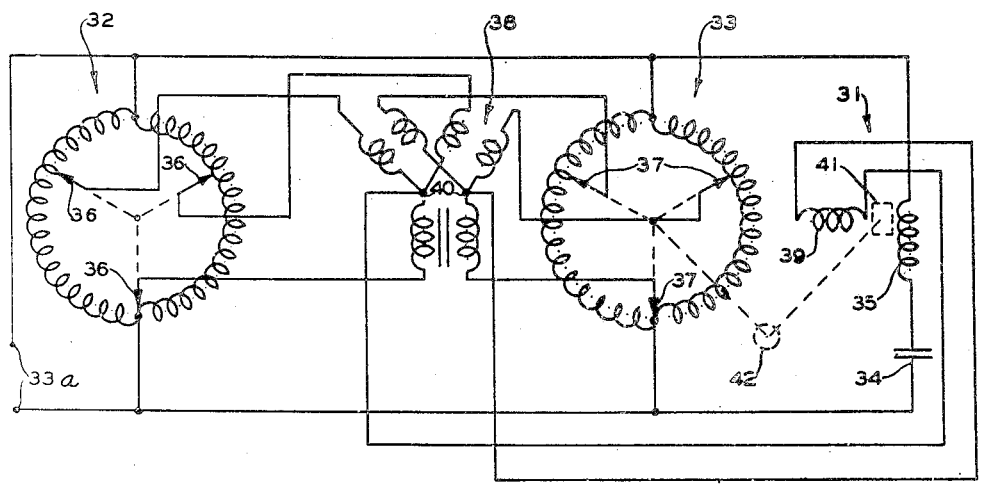

Referring now to Fig. 5 there is shown an arrangement for controlling a split-phase induction motor 31 by the use of two "Variacs" 32 and 33 so as to obtain a large amount of power transfer. The ring coils of "Variacs" 32 and 33 are connected in parallel to an alternating current source applied at terminals 33a. Also connected across terminals 33a through a coupling capacitor 34 is one field winding 35 of the motor 31. The contacts 36 of "Variac" 32 are connected to the contacts 37 of "Variac" 33 through the medium of star-connected transformers 38. The other field winding 39 of motor 31 is connected to the neutral or common terminal points 40 of the transformer combinations. The armature 41 of motor 31 is mechanically coupled by means such as a gear 42 to the shaft of "Variac" 33. Thus, when the contacts 36 of "Variac" 32 occupy a position corresponding to that of contacts 37 of "Variac" 33, no voltage difference exists between the terminals 40 of transformers 36 and, as a result, winding 39 is not energized and the motor 31 does not operate. However, if the contacts 34 are then displaced, a voltage difference is established between terminals 40 energizing the field winding 39 and causing the armature 41 to rotate until the contacts 37 are aligned with the contacts 36 and the voltage at terminals 40 is reduced to substantially zero level, at which point the motor 31 stops.

While there have been described what are at present considered the preferred embodiments of the invention, it will be obvious to those skilled in the art that various changes and modifications may be made therein without departing from the spirit of the invention, and hence it is not intended to limit the invention to the precise details disclosed herein but to cover all such changes and modifications as come within the purview of the appended claim.

I claim:

In apparatus for transmitting mechanical position from a first point to a second point by electrical means, a first continuously variable auto-transformer including a ring coil having three movable contacts thereon arranged in equally spaced relation, a second continuously variable auto-transformer including a ring coil having three movable contacts thereon arranged in equally spaced relation, star-arranged transformers coupling the movable contacts of said first transformer respectively with the movable contacts of said second transformer, a source of alternating current connected to the ring coils of said first and second transformers at opposing points of each such coil, a drive motor having its armature mechanically coupled to the contacts of said second transformer, means responsive to a voltage established at the common terminals of said star-arranged transformers for energizing said drive motor whereby it displaces the contacts of said second transformer to a position of correspondence with the contacts of said first transformer.

SAMUEL NOODLEMAN.

REFERENCES CITED

The following references are of record in the file of this patent:

UNITED STATES PATENTS

| Number | Name | Date |
|---|---|---|
| 559,904 | Pfatischer | May 12, 1896 |
| 705,482 | Thiermann | July 22, 1902 |
| 1,506,625 | Forster | Aug. 26, 1924 |
| 1,684,042 | Methlin | Sept. 11, 1928 |
| 2,322,498 | Zeitlin | June 22, 1943 |
| 2,349,963 | Harrison | May 30, 1944 |

FOREIGN PATENTS

| Number | Country | Date |
|---|---|---|
| 1,047 | Great Britain | Jan. 14, 1913 |